June 7, 1960
W. J. CROSHIER ET AL
2,939,220
WIRE HOLDING ATTACHMENT FOR THREE-WIRE
METHOD OF MEASURING THREADS
Filed April 4, 1958
3 Sheets-Sheet 1
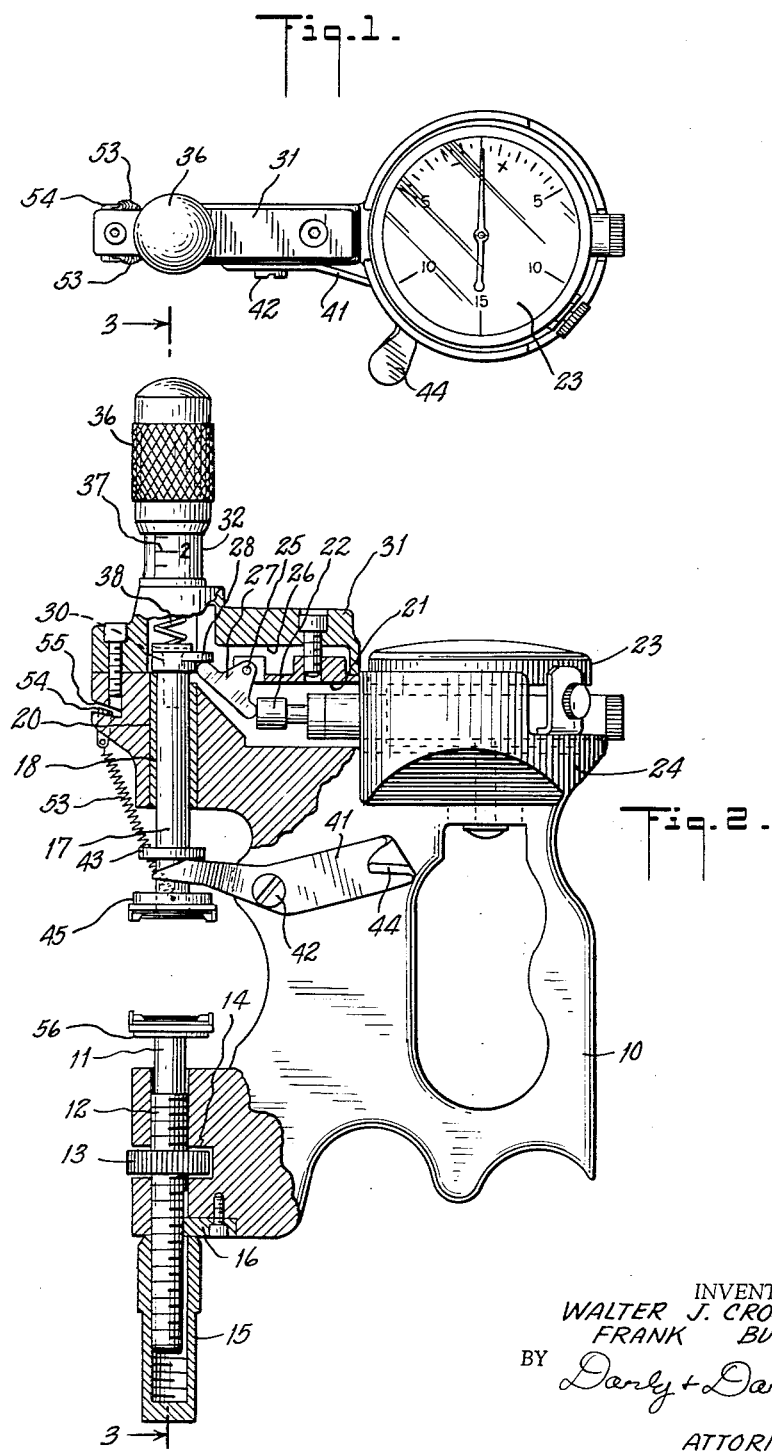
INVENTORS
WALTER J. CROSHIER
FRANK BURGI
BY Darby & Darby
ATTORNEYS

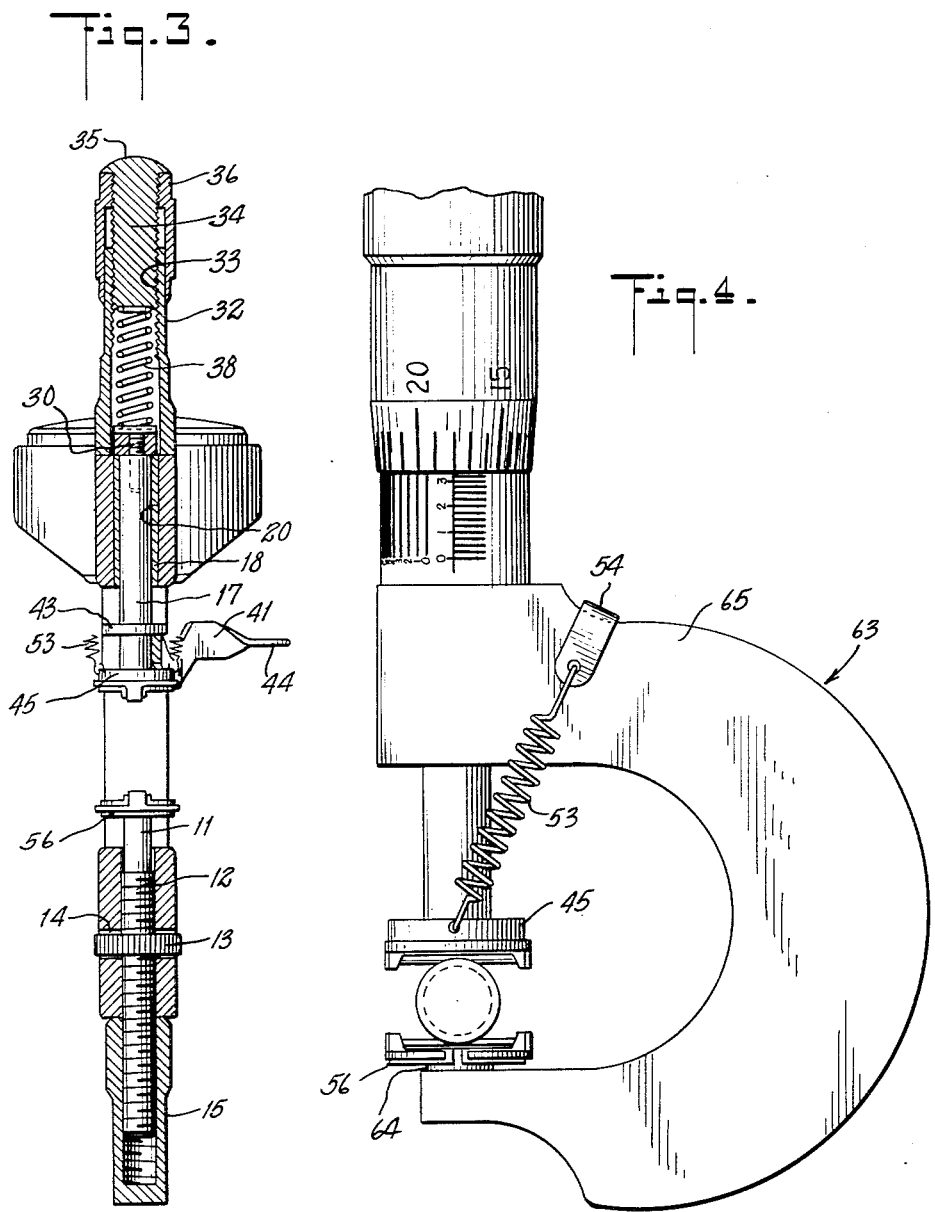

June 7, 1960
W. J. CROSHIER ET AL
2,939,220
WIRE HOLDING ATTACHMENT FOR THREE-WIRE
METHOD OF MEASURING THREADS
Filed April 4, 1958
3 Sheets-Sheet 3
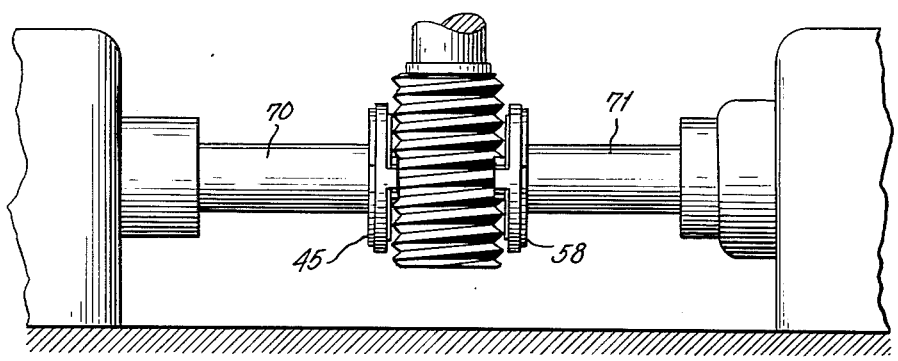
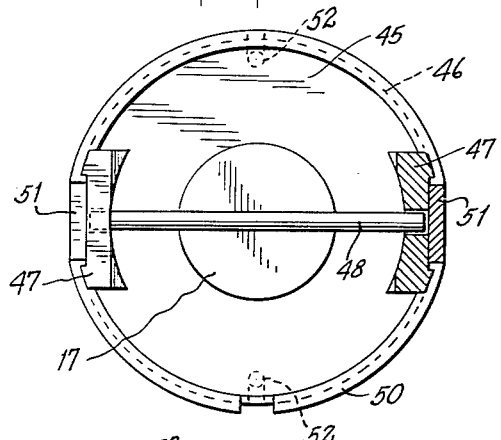
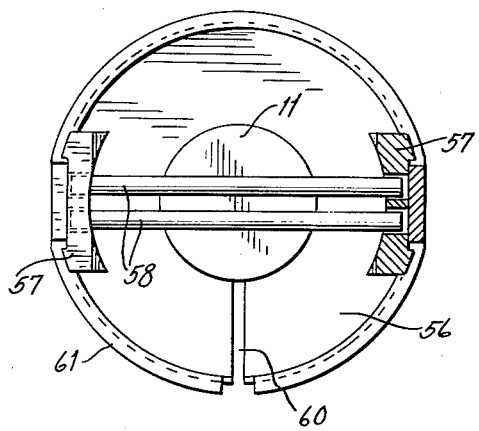
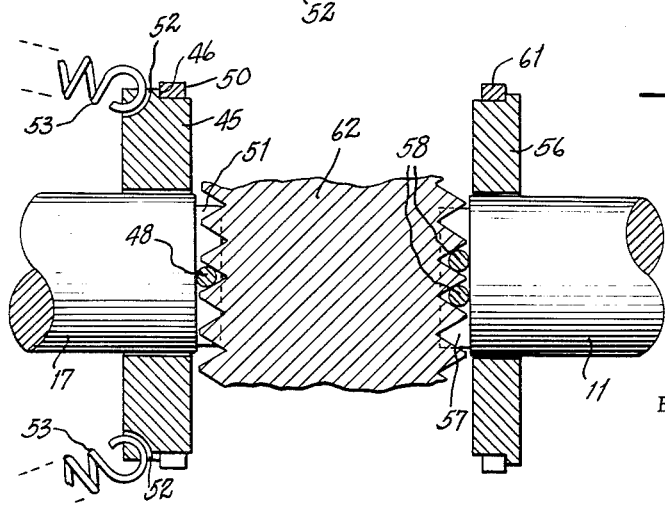
INVENTORS
WALTER J. CROSHIER
FRANK BURGI
BY
Darby +Darby
ATTORNEYS

United States Patent Office 2,939,220
Patented June 7, 1960

---

2,939,220

WIRE HOLDING ATTACHMENT FOR THREE-WIRE METHOD OF MEASURING THREADS

Walter J. Croshier, Hyde Park, and Frank Burgi, Poughkeepsie, N.Y., assignors to Standard Gage Company, Inc., Poughkeepsie, N.Y., a corporation of New York Filed Apr. 4, 1958, Ser. No. 726,580

5 Claims. (Cl. 33—167)

The present invention relates to thread gaging and particularly to thread gaging by the well known three-wire method.

More particularly still the invention relates to a wire holding attachment for thread gaging which may be utilized with a dial indicator gage or with a micrometer caliper and which necessitates no substantial modification of the instrument in order to adapt it for use in measuring threads by the method previously mentioned.

In Patent No. 2,822,624, issued February 11, 1958, and assigned to the assignee of the instant application, a wire holder for measuring threads by the three-wire method was disclosed. In this application, however, the wire holder and plunger assembly was in a single unit and it was therefore necessary to provide complete assemblies of gaging anvils and cooperating wires for each range of thread sizes to be gaged. The present invention provides a wire holder in the form of an attachment and makes it possible to utilize the same gaging instrument, such for example as a dial snap gage or a micrometer caliper, for measuring a wide range of thread sizes, only the wire holder being changed rather than the entire assembly of anvils, centering plungers and gaging wires and their holders.

It is an object of the invention to provide a wire holding attachment to hold the gaging wires used in the three-wire method of thread gaging to be utilized in a range of sizes on a single gaging instrument.

It is another object of the invention to provide a wire holding attachment so arranged that the two portions of the attachment may be readily placed, one on the fixed and one on the movable anvil of the gaging instrument without special tools and so arranged that the wires have a limited range of movement and will be properly guided into correct gaging position by the threads being gaged.

It is another object of the invention to provide one of the two portions of the attachment with a securing means which also serves to properly orient the wire holding member rotatably on the cooperating anvil.

Other objects and features of the invention will be apparent when the following description is considered in connection with the annexed drawings, in which, Figure 1 is a top plan view of a dial snap gage, the gage being adapted for use with the three-wire gaging attachment of the instant invention;

Figure 2 is a side elevational view of the gage of Figure 1, partly in section, showing the mode of securing the three-wire gaging attachment to the gage as well as the mechanism which transmits motion from the movable anvil to the dial indicator and means for exerting a preselected pressure upon the moving anvil;

Figure 3 is a front elevational view of the gage of Figures 1 and 2 showing particularly the locking means for the lower fixed anvil and means for regulating the pressure on the upper movable anvil;

Figure 4 is a side elevational view of a micrometer caliper showing the three-wire gaging attachments of the present invention applied thereto;

Figure 5 is a bottom plan view of the upper gage wire holding attachment, the drawing being broken away to illustrate particularly that the wire has a limited amount of play in its holder;

Figure 6 is a top plan view of the lower gage wire holder or attachment showing its construction. This view likewise is broken away in order to illustrate the mounting of the gage wires to permit limited movement thereof;

Figure 7 is a sectional view through the gaging anvils and wire holding attachments showing the wires in position to gage a threaded piece; and Figure 8 is a front elevational view showing the application of the wire holding attachments of our invention to a precision length measuring machine such, for example, as that known as the Pratt & Whitney super micrometer.

The invention will first be described in connection with a snap dial gage which gage is particularly adapted for use with the invention although it will be understood that the attachments may be used with other forms of dial indicator gage. In this description, Figures 1 through 3, 5 and 6 will be referred to.

The snap gage illustrated consists of a generally U-shaped body 10 having a fixed anvil 11 mounted in the lower arm of the U in a conventional manner. In the present instance the anvil 11 is provided with a threaded shank 12 on which is a nut 13 in a slot 14 of the lower arm of the frame 10. As the nut 13 is rotated the anvil will of course be raised and lowered so that it can be adjusted to a desired position. Threaded on the end of the anvil shank 12 is a cap nut 15 which serves to lock the anvil in an adjusted position. Also a plate 16 is provided which abuts against a flatted portion of the anvil shank 12 to prevent it from rotating and thus assure that the anvil be reciprocated when the nut 13 is rotated.

In the upper arm of the U-shaped frame 10 a movable anvil 17 is reciprocably mounted in a bushing 18 fixed in the bore 20. Extending into a bore 21 in the frame member 10, which bore is at right angles to the bore 20, is the measuring plunger 22 of a dial indicator 23 which indicator is of a well known type. As is clearly shown in the drawing, the frame member 10 is provided with a generally semicircular base portion 24 to which the dial indicator is fixed, the base having a semicylindrical upstanding flange which houses the indicator.

Pivotally mounted at 25 within a slot 26 formed in the upper arm of the U-shaped frame 10 is a T-shaped lever 27 one end of which engages an extension of washer 28 fixed to the upper end of the shank of anvil 17 and the other end of which engages the measuring plunger 22 of dial indicator 23. It will be apparent, therefore, that the reading of the gage 23 will depend upon the position of the anvil 17 since the measuring plunger 22 of the gage is pressed outwardly in the usual manner causing the gage to follow any upward movement of the anvil 17. As is clear from the drawing, a washer 28 is fixed to the anvil 17 by means of screw 30, and the washer seats against the upper edge of the bushing 18 and the upper surface of the U-shaped frame thus limiting downward movement of the anvil.

A cover 31 for the upper arm of the frame 10 is provided which cover in this instance has incorporated therein a means for exerting a desired predetermined pressure upon the anvil 17. This means comprises a tubular member 32 (integral with cover 31) which is internally threaded as indicated at 33 and provided with an externally threaded insert 34. Threadedly mounted on the insert 34 and bearing against the head 35 thereof is a sleeve 36 which extends downwardly and cooperates with a scale 37 on the tubular member 32. Within the tubular member 32 is a spring 38 which bears against the screw 30 urging the anvil downwardly.

The arrangement just described provides, as stated hereinabove, a means for compressing the spring 38 to a known extent to exert a desired and predetermined pressure upon the anvil 17 which is desirable since standards have been established for gaging pressure when utilizing the three-wire method of gaging pitch diameter. Thus the U.S. Bureau of Standards suggests a contact load of one pound when measuring pitches finer than twenty threads per inch by the three-wire method and a load of two and one-half pounds for pitches of twenty threads per inch and coarser. The spring 38 and the associated parts heretofore described are so arranged that the spring load on the upper anvil may be varied from one pound to two and one-half pounds in order to meet the standards just mentioned.

In order to provide a means for readily retracting the upper anvil so that the workpiece may be inserted and removed, a retracting lever 41 (Figures 2 and 3) is pivotally mounted on the gage frame by suitable means such as the screw 42. One end of lever 41 engages a collar 43 fixed on the anvil 17. The other end of the lever 41 is formed as a thumbpiece 44 as clearly indicated in Figure 2, and thus by operation in a downward direction of the thumbpiece the anvil is moved upwardly against the spring pressure of the spring 38.

Referring now to Figures 5 and 6, the wire holding attachments of the instant invention are there shown in detail, Figure 5 showing the construction of the upper or movable anvil and Figure 6 that of the lower relatively fixed anvil.

The attachment for the movable anvil comprises an annular plate or washer 45 having a shoulder 46 and a resulting smaller diameter at its lower surface. Projecting downwardly from the washer or plate 45 are two integral ears at opposite ends of a diameter, these ears extending in a generally circumferential direction and being designated 47. Each of these ears has a hole extending therethrough centrally thereof, these holes being slightly larger than the diameter of the gaging wire 48 to be used therein, thus providing for a shifting of the wire from a true diametrical position to conform to the helix angle of the thread being gaged. Additionally, the entire plate may rotate upon the anvil assuring that the wire will lie properly in the thread.

A spring retaining washer 50 is provided which washer extends circumferentially around the lesser diameter lower portion of the plate 45 seating against shoulder 46 and has downwardly extending ears 51 which prevent the gage wire 48 from sliding axially out of position and which retain it in its holder. As indicated in Figures 5 and 7, holes are provided in the plate 45 at 52 to receive the ends of coil springs which, as will shortly be described, are utilized to hold the plate and its gaging wire in position on the movable anvil.

Referring now particularly to Figure 2, it will be seen that the annular plate 45 is held in position on the gaging anvil by means of the two coil springs 53 which, at their upper ends, are fixed to a U-shaped saddle member 54 which is in turn positioned in a slot 55 in the frame 10. Thus these springs hold the plate 45 in position on the anvil with the gaging wire 48 in contact with the face of the anvil. Additionally, the springs tend to hold the plate in a rotational position such that the wire extends in a plane generally parallel to the plane of the gage frame 10, but permit the plate to rotate so that the wire can accommodate itself to the helix angle of the particular thread being gaged.

The lower attachment of the set is constructed in a manner similar to the upper attachment or plate just described. The lower plate comprises an annular plate or washer 56 which is of lesser diameter on its upper edge and which has upwardly extending ears 57 similar to the ears 47 of the plate or washer 45. In this instance each ear has two diametrically extending bores each bore being slightly greater in diameter than the diameter of the gaging wire 58 to be inserted therein. This lower plate is provided with a saw kerf or other split at 60 and since the central aperture is smaller than the anvil shank on which it is to be placed frictional engagement exists between the walls of the central opening in plate 56 and the anvil 11 on which the disk is placed. Spring retainer ring 61 placed about the upper smaller diameter portion of the plate 56 is provided with ears which retain the gaging wires position. In operation the disk is placed as shown in Figures 1 and 2 with the wires 58 extending in the direction generally parallel to the plane of the gage frame and to the wire 48 of the upper attachment of the set. By virtue of the fact that the plate 56 engages the anvil 11 frictionally, it can be set to conform to the helix angle of a thread, the pitch diameter of which is being gaged. Of course, the plate 56 is placed on the anvil 11 in position such that the gage wires 58 rest on the anvil face.

It will be obvious from the foregoing that when different threads are to be gaged, a different pair of wire holding attachments can be substituted, the wires of the new pair of attachments being larger or smaller as the case may be.

Figure 7 illustrates the use of the gage in a preferred position, i.e., with the anvils extending horizontally (since the spring loading is not then affected by the weight of the instrument), and shows that the device is very readily utilized since the wire 48 cooperates with the wires 58 to measure the pitch diameter of the threaded workpiece 62 which is inserted therebetween. It will be clear from a consideration of this figure in connection with the other figures that the retracting means discussed is a considerable convenience since otherwise it would be difficult to remove the workpiece. Nevertheless, the specific construction of the retracting means forms no part of our present invention and has been shown solely as an aid to understanding the mode of operating a gage provided with the gaging wire holders of our invention.

Referring now to Figure 4, there is shown therein a micrometer caliper 63 of conventional form with three-wire thread gaging holders in position thereon. The holders in this instance are exactly similar to the holders hereinabove described, and operate in the same manner and with the same results. The only difference is that due to the fact that the fixed anvil 64 of a micrometer caliper is frequently very short, the two-wire holding member or plate 56 must, for this reason, be thinner than would normally be the case when used on a snap gage. Another slight difference is in the mode of mounting. In connection with the snap gage frame, that frame was especially provided with a slot 55 to receive the saddle member 54. The same saddle member 54 is utilized with the micrometer caliper by simply placing the saddle about the U-shaped frame 65 of the caliper 63.

Referring now to Figure 8, there is shown therein a precision length measuring machine such as the Pratt & Whitney super micrometer. In this instance both of the plates 45 and 58 are split in the manner indicated at 60 in Figure 6 which is entirely practical since this length measuring machine is always used with the anvils extending horizontally and there is therefore no danger that the wire holding attachment will fall off such as might happen were the upper plate or attachment held frictionally in the snap gage or micrometer structure. The Pratt & Whitney length measuring machine is not described in any detail since it is a well known device and Figure 8 clearly illustrates the mode of placing the wire holding attachments on the fixed and movable anvils thereof designated respectively 70 and 71.

While we have described a preferred embodiment of our invention it will be obvious that modifications may be made and we wish therefore to be limited not by the foregoing description, but instead solely by the claims granted to us.

What is claimed is:

1. An attachment for gages of the dial snap, micrometer caliper and similar types to adapt such gages for the three-wire method of thread gaging which comprises, a pair of annular plates, ears extending perpendicularly to said plates on opposite ends of the diameter of each of said plates, apertures in said ears, a single gage wire mounted in one aperture in each ear of one of said plates and extending diametrically across said plate, said wire being smaller than said apertures, a pair of gage wires each mounted in separate apertures in said ears of the other said plate, said wires being spaced apart and extending substantially diametrically of said plate, each said wire being mounted in two apertures on the same side of the diameter, said wires being smaller than said apertures, means for holding said plate having said two gaging wires on one anvil of a snap gage or caliper, said means comprising a radial slot in said plate and a central aperture smaller than the anvil shank whereby the walls of the central aperture of said plate are pressed against the peripheral portion of the anvil, and means for holding said annular plate having a single gaging wire on the other anvil of the snap gage or caliper, said means comprising a paid of coil springs fixed to said plates at the ends of a diameter thereof, the opposite ends of said springs being fixed on a portion of the gage frame axially removed from the corresponding anvil face and off-center as respects the anvil.

2. An attachment for gages of the dial snap, micrometer caliper and similar types to adapt such gages for the three-wire method of thread gaging which comprises a pair of annular plates, ears extending perpendicularly to said plates on opposite ends of the diameter of each of said plates, apertures in said ears, a single gage wire mounted in said apertures in the ears of one of said plates and extending diametrically across said plate, a pair of gage wires in paired ones of said apertures in the ears of the other said plate, said wires being spaced apart and extending substantially diametrically of said plate, a split resilient ring extending about the periphery of each of said plates, said rings having ears thereon corresponding to the ears of said plate, said ears on said rings being radially outward of the ears on said plate and retaining said gaging wires in position in said apertures, means for holding said plate having said two gaging wires on one anvil of a snap gage or caliper and means for holding said annular plate having a single gaging wire on the other anvil of the snap gage or caliper.

3. An attachment for gages of the dial snap, micrometer caliper and similar types to adapt such gages for the three-wire method of thread gaging which comprises a pair of annular plates, ears extending perpendicularly to said plates on opposite ends of the diameter of each of said plates, apertures in said ears, a single gage wire mounted in said apertures in the ears of one of said plates and extending diametrically across said plate, a pair of gage wires in paired ones of said apertures in the ears of the other said plate, said wires being spaced apart and extending substantially diametrically of said plate, a split resilient ring extending about the periphery of each of said plates, said rings having ears thereon corresponding to the ears of said plate, said ears on said rings being radially outward of the ears on said plate and retaining said gaging wires in position in said apertures, means for holding said plate having said two gaging wires on one anvil of a snap gage or caliper, said means comprising a radial slot in said plate and a central opening smaller than the anvil shank whereby the walls of the central aperture of said plate are pressed against the peripheral portion of the anvil, and means for holding said annular plate having a single gaging wire on the other anvil of the snap gage or caliper, said means comprising a pair of coil springs fixed to said plates at the ends of a diameter thereof, the opposite ends of said springs being fixed on a portion of the gage frame axially removed from the corresponding anvil face and off-center as respects the anvil.

4. A dial snap gage for gaging thread pitch diameter by the three-wire method comprising, in combination, a U-shaped frame, an anvil mounted in one arm of said frame in an adjustable fixed position, a second anvil mounted in the second arm of said frame in axial alignment with said first anvil for movement toward and away from said first anvil, a dial indicator mounted on said frame with the axis of its measuring plunger perpendicular to the common axis of said anvils, means for transmitting movement of said movable anvil to said dial indicator plunger, said means comprising means in axial alignment with said movable anvil to exert a desired pressure thereupon, means to limit the movement of said movable anvil toward said fixed anvil, an annular plate mounted on said fixed anvil, said plate having a pair of threaded gaging wires extending substantially diametrically thereacross and across the face of said fixed anvil, a second annular plate, means comprising a pair of coil springs extending from said plate to a fixed point on said gage frame axially removed from said anvil and off center as respects said anvil, said means mounting said second plate on said movable anvil, said second plate having a single thread gaging wire extending diametrically thereacross and across the face of said movable anvil, said gaging wires of said first plate being adapted to be in adjacent thread portions at one side of a piece to be gaged, and said gaging wire of said second plate lying in a thread portion intermediate said mentioned portions and at the opposite side of the piece to be gaged.

5. A dial snap gage for gaging thread pitch diameter by the three-wire method comprising, in combination, a U-shaped frame, an anvil mounted in one arm of said frame in an adjustable fixed position, a second anvil mounted in the second arm of said frame in axial alignment with said first anvil for movement toward and away from said first anvil, a dial indicator mounted on said frame with the axis of its measuring plunger perpendicular to the common axis of said anvils, means for transmitting movement of said movable anvil to said dial indicator plunger, said means comprising means in axial alignment with said movable anvil to exert a desired pressure thereupon, means to limit the movement of said movable anvil toward said fixed anvil, an annular plate having integral ears extending perpendicularly to said plate, a pair of thread gaging wires mounted in corresponding pairs of apertures in said ears lying at opposite sides of a diameter of said plate, a radially extending slot in said plate, a resilient ring extending about the periphery of said plate, said ring having ears corresponding in position to said integral ears of said plate to hold said wires in position, said plate being mounted on said fixed anvil and held in position by the pressure of the internal walls of said annular plate against the shank of said fixed anvil, a second annular plate, means comprising a pair of coil springs extending from said plate to a fixed point on said gage frame, axially removed from the face of said second anvil and off center as respects said anvil axis, said means mounting said second plate on said movable anvil, said second plate having a single thread gaging wire extending diametrically thereacross and across the face of said movable anvil, said gaging wires of said first plate being adapted to be in adjacent thread portions at one side of a piece to be gaged, and said gaging wire of said second plate lying in a thread portion intermediate said mentioned portions and at the opposite side of the piece to be gaged.

(References on following page)

References Cited in the file of this patent

UNITED STATES PATENTS

| | | |
|---|---|---|
| 1,854,244 | Allison et al. | Apr. 19, 1932 |
| 2,224,281 | Webber | Dec. 10, 1940 |
| 2,296,820 | Lester | Sept. 22, 1942 |
| 2,375,557 | Hurley | May 8, 1945 |
| 2,410,571 | Easton et al. | Nov. 5, 1946 |
| 2,431,021 | Bourdelais | Nov. 18, 1947 |
| 2,586,114 | Swanson | Feb. 19, 1952 |
| 2,692,438 | Schneider | Oct. 26, 1954 |
| 2,759,270 | Fine | Aug. 21, 1956 |

FOREIGN PATENTS

| | | |
|---|---|---|
| 216,443 | Switzerland | Dec. 1, 1941 |